Jan. 14, 1941.　　　L. C. BROECKER　　　2,228,984
PNEUMATIC TIRE VALVE
Filed May 7, 1938
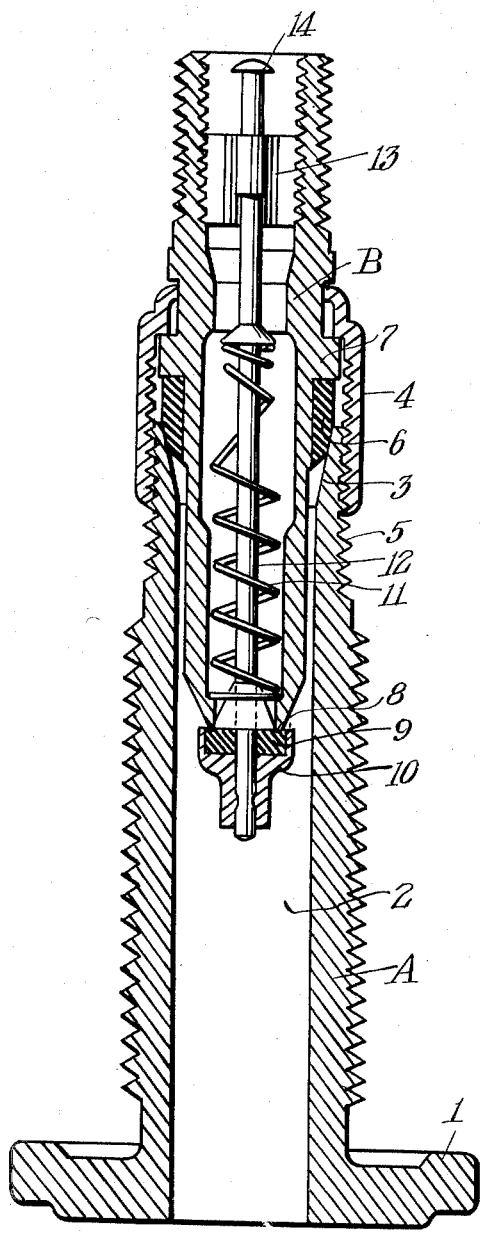
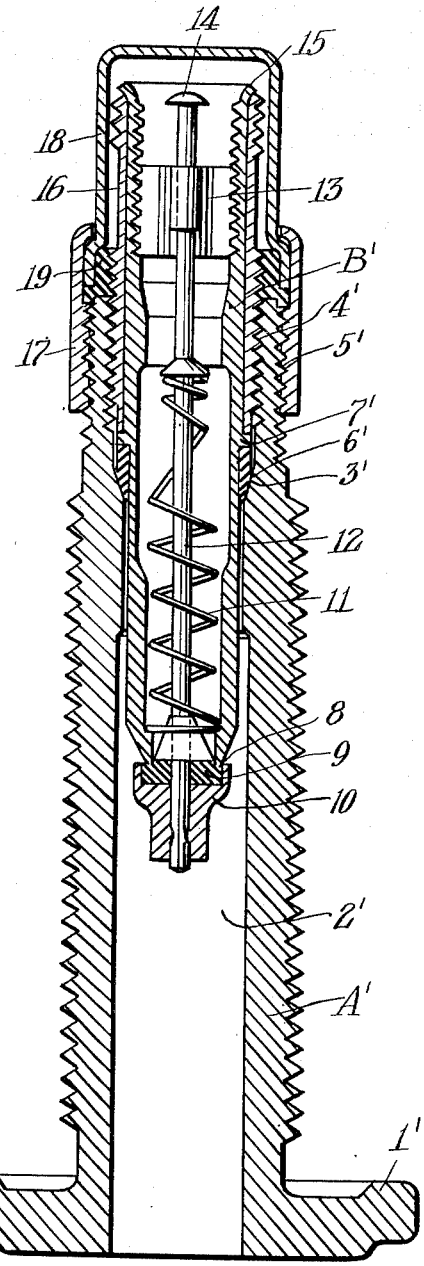
INVENTOR.
Lewis C. Broecker
BY Kenyon & Kenyon
ATTORNEYS.

Patented Jan. 14, 1941

2,228,984

UNITED STATES PATENT OFFICE 2,228,984

PNEUMATIC TIRE VALVE

Lewis C. Broecker, Bridgeport, Conn., assignor to Bridgeport Brass Company, Bridgeport, Conn., a corporation of Connecticut Application May 7, 1938, Serial No. 206,597

8 Claims. (Cl. 251—144)

This invention relates to pneumatic tire valves.

In certain uses of pneumatic tires, it is common practice partially to fill tires with water and then inflate them with air. For example, in hydroplane skid tires, water is introduced to give the skid the proper amount of buoyancy and in farm tractor tires water is introduced to add weight for the purpose of increasing the traction. Standard tire valves, due to their small openings, are unsatisfactory for introducing water into the tire as the tires used for the purposes above described are rather large and hold quite a volume of water, thus requiring an undesirably long time to introduce the required amount of water.

An object of this invention is a pneumatic tire valve by use of which water may be introduced into the tire at a sufficiently high rate that the time required to introduce the desired quantity of water is relatively short.

Other objects, novel features and advantages of this invention will become apparent from the following specification and accompanying drawing:

Fig. 1 is a longitudinal section through one embodiment of the invention and

Fig. 2 is a longitudinal section through a second embodiment of the invention.

The valve illustrated in Fig. 1 comprises a stem A having a conventional base 1 and a bore 2 of larger than the usual diameter in a valve stem. The bore 2 is formed with a tapered seat 3 at the end opposite the base 1 and a nut 4 is screwed on to the threads 5 of the stem A. A rubber gasket 6 is interposed between the tapered seat 3 and a shoulder 7 on the tubular insert B. The nut 4 has an inner shoulder engaging the shoulder 7 so that when the nut 4 is threaded on to the stem A, it forces the insert B toward the tapered seat 3, thus compressing the gasket 6 to form an air and water-tight joint between the stem A and insert B. The inner end of the insert B is formed to constitute a valve seat 8 which is engaged by a soft rubber valve 9 held in the cup 10. A spring 11 has one end engaging a shoulder in the insert B near the valve seat 8 and has its other end engaging a shoulder on the center pin 12 which is attached at one end to the cup 10, the spring serving to hold the rubber valve 9 in air-tight contact with the valve seat 8. At its other end, the insert B is provided with interior screw threads of the same diameter as the inner threads at the cap end of a conventional valve stem and a flat screw plug 13 threaded into the end of the insert B serves as a guide for the center pin 12. A head 14 is provided on the pin 12 for engagement with the plug 13 to limit the extent of movement of the valve 9 away from the seat 8.

In order to introduce water into a tire equipped with the valve above described, the nut 4 is rotated to unscrew it from the stem 5, thereby permitting removal of the insert B and its associated parts from the bore of the stem. A hose coupling is now screwed on to the end of the stem A and water is introduced through the unobstructed bore of the stem. After sufficient water has been introduced, the hose coupling is unscrewed and the insert B is assembled with the same and the tire inflated with air by means of a conventional air chuck. The inflating is accomplished much faster than would be possible with a conventional valve inasmuch as the opening through the valve seat 8 is much greater than the opening in the conventional valve core.

The valve cup 10 is peened to the pin 12 and is attached thereto sufficiently firmly to maintain assembly under ordinary conditions of use but permits disassembly by a strong pull. Should the valve become leaky due to dirt or foreign matter getting embedded in the valve so as to prevent its seating tightly against the valve seat 8 or should the rubber itself, after long use, deteriorate to such an extent that it loses its sealing capacity and qualities, the center pin 12 may be pulled out of the cup 10 by unscrewing the plug 13 from the insert B, thereby applying sufficient pressure on the head 14 to detach the pin from the cup. The parts 10, 11, 12 and 13 may be removed from the insert B and a conventional valve core of either the long or short type can then be screwed into the insert B.

In the modification disclosed in Fig. 2, the stem A' provided with the conventional base 1' has a bore 2' of larger diameter than the conventional bore and is provided with a tapered seat 3' between which and a shoulder 7' on the insert B' is interposed a rubber gasket 6'. The nut 4' assembled with the insert B' has threads 5' engaging with the interior threads at the end of the stem A', the nut being held between the shoulder and the flange 15 at the end of the insert. The nut likewise is provided with flat portions 16 to facilitate gripping the nut by means of a wrench or pliers. The arrangement of valve seat 8, valve 9, cap 10, spring 11, center pin 12, plug 13, head 14 is the same as in Fig. 1 and the same procedure is followed in inflation of a tire as previously described.

A valve cap of standard design may be used on both types, but, obviously, will only prevent loss of fluid which may escape between valve seat 8 and valve 9. The modification illustrated in Fig. 2 permits the use of the cap shown therein. This cap is composed of the nut 17 and the cap proper 18 which is provided with a rubber gasket 19 which seats against the end of the stem A', thus sealing in air leaks through the valve proper as well as any air leaks between the rubber gasket 6' and the tapered seat 3'. This cap also provides a very effective protection against injury to the threads on the nut 4' as well as the threads 5' on the stem A'.

It is of course understood that various modifications may be made in the structure above described, without in any way departing from the spirit of the invention as defined in the appended claims.

I claim:

1. A tire valve comprising a hollow stem, a tubular insert in said stem, means for maintaining an air-tight connection between said insert and said stem, a flat-sided plug having screw-threaded connection with the interior of said insert, a valve engageable with one end of said insert, a pin slidably supported by said plug and removably connected to and extending through said valve, said pin having a head with which said plug is engageable to pull said pin through and remove it from said valve, and resilient means within said insert below said plug tending to hold said valve in contact with said end of said insert.

2. A tire valve comprising a hollow stem, a tubular insert in said stem, a nut assembled with said insert and having screw-threaded engagement with said stem, a flat-sided plug having screw-threaded engagement with the interior of said insert, a valve engageable with one end of said insert, a pin slidably supported by said plug and removably connected to and extending through said valve, said pin having a head with which said plug is engageable to pull said pin through and remove it from said valve, and resilient means tending to hold said valve in contact with said end of said insert.

3. A tire valve comprising a hollow stem, a tubular insert in said stem, a nut assembled with said insert and having screw-threaded engagement with the exterior of said stem, a flat-sided plug having screw-threaded engagement with the interior of said insert, a valve engageable with one end of said insert, a pin slidably supported by said plug and removably connected to and extending through said valve, said pin having a head with which said plug is engageable to pull said pin through and remove it from said valve, and resilient means tending to hold said valve in contact with said end of said insert.

4. A tire valve comprising a hollow stem, a tubular insert in said stem, a nut assembled with said insert and having screw-threaded engagement with the interior of said stem, a flat-sided plug having screw-threaded engagement with one end of said insert, a pin slidably supported by said plug and removably connected to and extending through said valve, said pin having a head with which said plug is engageable to pull said pin through and remove it from said valve, and resilient means tending to hold said valve in contact with said end of said insert.

5. A tire valve according to claim 1 wherein said pin and valve are provided respectively with means impositively engaging each other whereby said pin is removably connected to said valve.

6. A tire valve according to claim 2 in which said pin and valve are provided respectively with means impositively engaging each other whereby said pin is removably connected to said valve.

7. A tire valve according to claim 3 in which said pin and valve are provided respectively with means impositively engaging each other whereby said pin is removably connected to said valve.

8. A tire valve according to claim 4 in which said pin and valve are provided respectively with means impositively engaging each other whereby said pin is removably connected to said valve.

LEWIS C. BROECKER.